United States Patent
Idzik et al.

(10) Patent No.: US 7,554,289 B2
(45) Date of Patent: Jun. 30, 2009

(54) APPARATUS AND METHOD FOR THE POWER MANAGEMENT OF OPERATIVELY CONNECTED BATTERIES RESPECTIVELY ON A HANDHELD ELECTRONIC DEVICE AND A HOLDER FOR THE HANDHELD ELECTRONIC DEVICE

(75) Inventors: Jacek S. Idzik, Kenilworth (CA); Siong Litingtun, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 244 days.

(21) Appl. No.: 11/556,547

(22) Filed: Nov. 3, 2006

(65) Prior Publication Data

US 2008/0106232 A1    May 8, 2008

(51) Int. Cl.
 *H01M 10/46* (2006.01)
(52) U.S. Cl. ..................................................... 320/110
(58) Field of Classification Search ................. 320/103, 320/106, 110, 114, 115, 116
 See application file for complete search history.

(56) References Cited

U.S. PATENT DOCUMENTS

| | | |
|---|---|---|
| 5,353,017 A | 10/1994 | Suzuki et al. |
| 5,551,079 A | 8/1996 | Panther et al. |
| 5,914,585 A | 6/1999 | Grabon |
| 6,184,654 B1 | 2/2001 | Bachner, III et al. |
| 2003/0030412 A1 | 2/2003 | Matsuda et al. |
| 2003/0155887 A1 | 8/2003 | Bourilkov et al. |
| 2003/0178967 A1 | 9/2003 | Khatri |
| 2003/0197485 A1 * | 10/2003 | Miller et al. ................. 320/112 |
| 2005/0189913 A1 | 9/2005 | Vitanov et al. |
| 2006/0226805 A1 | 10/2006 | Yu |

FOREIGN PATENT DOCUMENTS

| | | |
|---|---|---|
| DE | 10305477 A1 | 8/2004 |
| EP | 0 274 279 A2 | 7/1988 |
| EP | 1569315 A | 8/2005 |
| EP | 1 600 907 A1 | 11/2005 |
| GB | 2352887 A | 2/2001 |
| GB | 2386267 A | 9/2003 |
| JP | 2006-260183 | 9/2006 |
| WO | 99/53621 A1 | 10/1999 |

\* cited by examiner

*Primary Examiner*—Edward Tso
(74) *Attorney, Agent, or Firm*—Daniel C. Abeles; Brij K. Agarwal; Eckert Seamans Cherin & Mellott, LLC (57) ABSTRACT

A handheld electronic device in conjunction with a holder for the handheld electronic device that together form an electronic device. The handheld electronic device includes a first battery and the holder includes a second battery and a charging apparatus. When the handheld electronic device and the holder are electrically connected together, such as when the handheld electronic device is received in a cavity formed in the holder the charging apparatus charges the first battery on the handheld electronic device from the second battery on the holder when the first battery charge has been depleted to a given level and the second battery charge is above a second given level. Alternatively, if the first battery charge is above a third given level the first battery charges the second battery if the second battery is not fully charged.

12 Claims, 7 Drawing Sheets

APPARATUS AND METHOD FOR THE POWER MANAGEMENT OF OPERATIVELY CONNECTED BATTERIES RESPECTIVELY ON A HANDHELD ELECTRONIC DEVICE AND A HOLDER FOR THE HANDHELD ELECTRONIC DEVICE

CROSS REFERENCE TO RELATED APPLICATIONS

This application is related to pending application Ser. No. 10/788,078, filed Feb. 26, 2004.

BACKGROUND

1. Field

This device and method relate generally to handheld electronic devices and, more particularly, to an electronic device having an on board battery that shares charge with a second battery in a holster. The device and method described herein also relate to a method of sharing charge between a battery on a handheld electronic device and a second battery in a holster for holding the handheld electronic device.

2. Background

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus are small and battery powered. While some handheld electronic devices include a wireless communication capability, other handheld electronic devices are stand alone devices that do not communicate with other devices.

A battery of a handheld electronic device typically constitutes a significant portion of the weight of the handheld electronic device. While it is often desirable to reduce the weight and shrink the form factor of a handheld electronic device, it is nevertheless necessary to provide sufficient battery power and capacity to enable the handheld electronic device to function properly for an appropriate duration of time. Power consumption can be of particular importance in handheld electronic devices having a wireless capability that complies with GPRS/GSM operating guide lines, since a power amplifier of such a handheld electronic device can have a peak current requirement of up to about 2.5 amperes during transmission bursts.

It would be desirable to provide an improved handheld electronic device having a reduced weight and/or a smaller form factor than currently known devices without sacrificing battery power or battery life.

BRIEF DESCRIPTION OF THE DRAWINGS

A further understanding of the device and method disclosed herein can be gained from the following description of the preferred embodiments when read in conjunction with the accompanying drawings in which.

DESCRIPTION OF THE PREFERRED EMBODIMENTS

Figure 1:
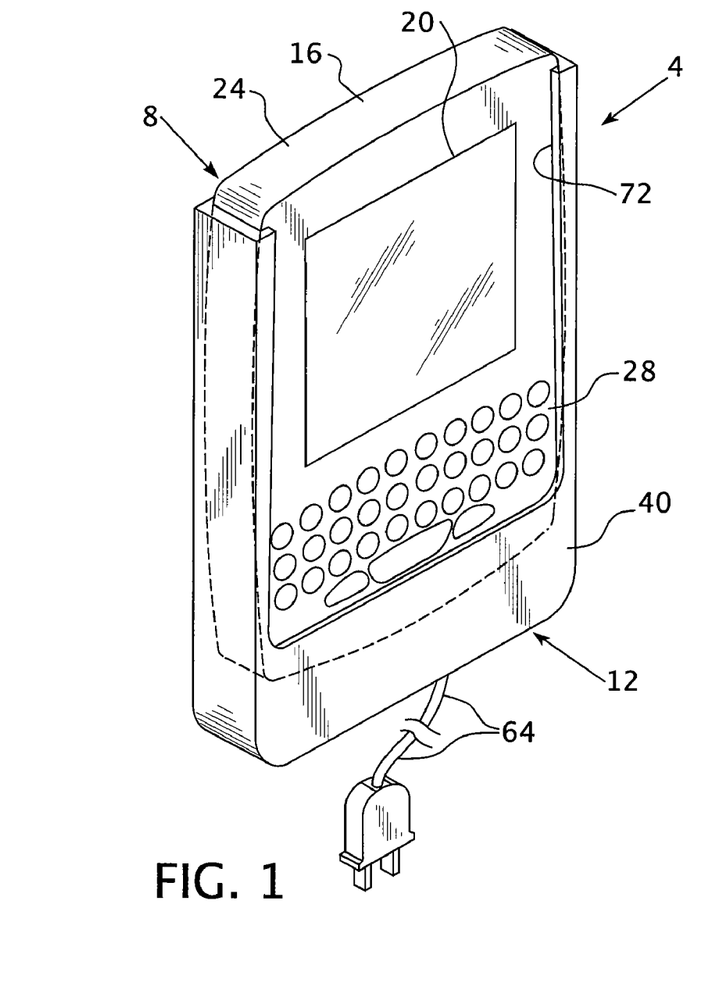
FIG. 1 is an isometric view of an improved electronic device in accordance with the embodiments described herein that includes an improved handheld electronic device and an improved holder.
Figure 2:
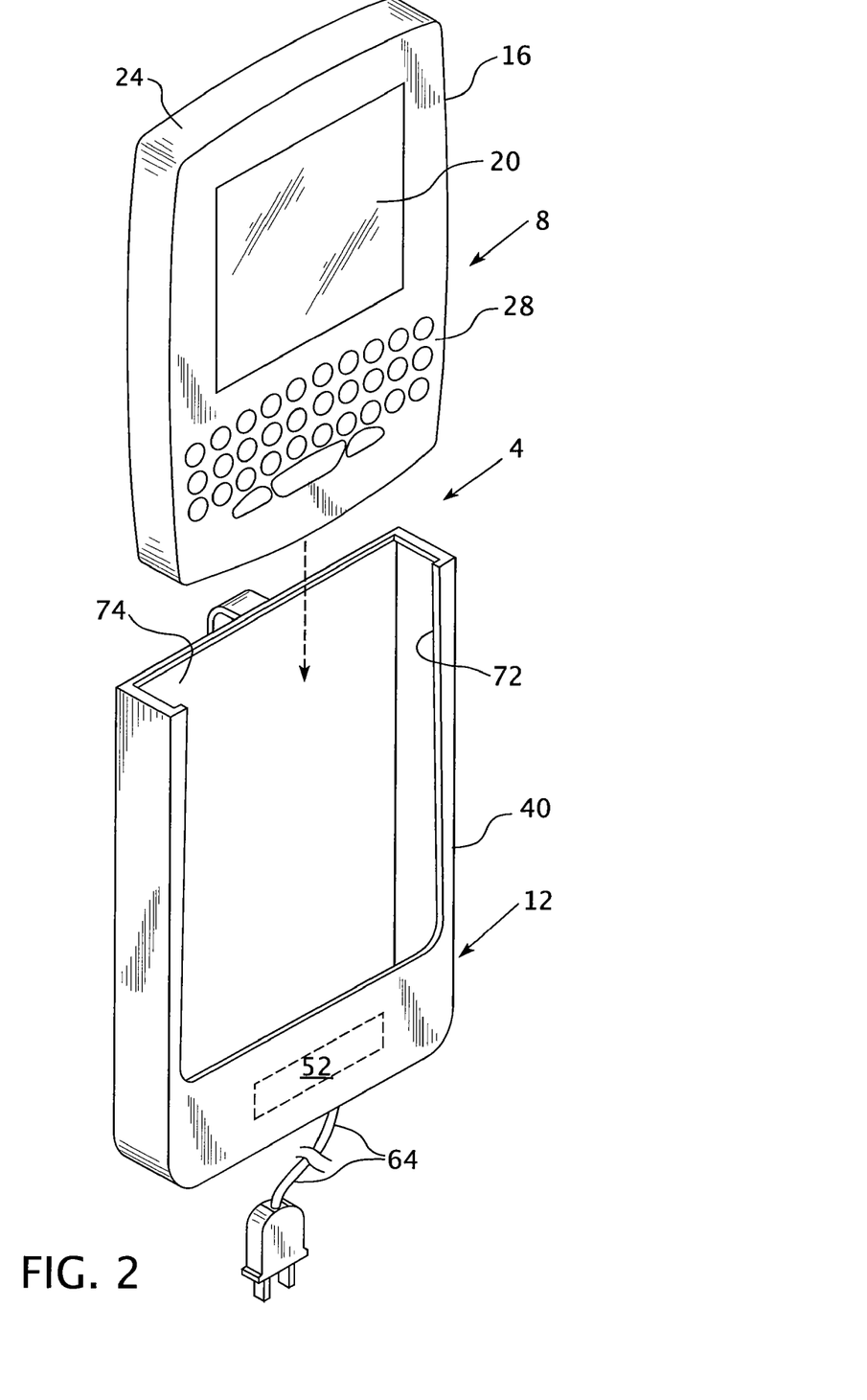
FIG. 2 is an exploded isometric view of the improved electronic device of FIG. 1.
Figure 3:
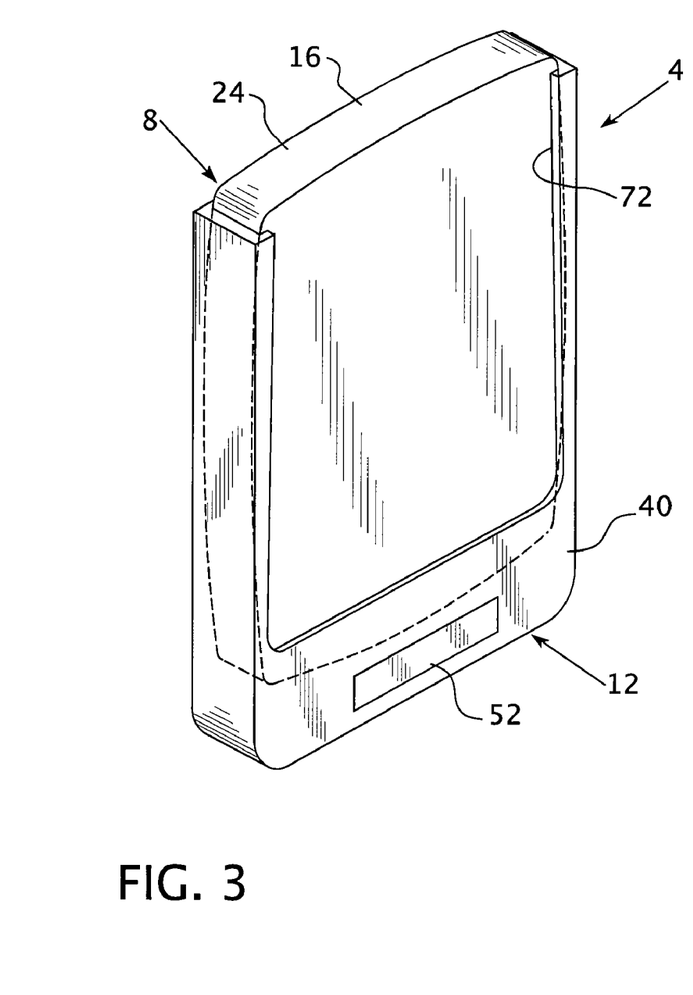
FIG. 3 is an isometric view of an improved electronic device in accordance with another embodiment described herein.

An improved electronic device 4 is indicated generally in FIGS. 1 and 2. The electronic device 4 includes an improved handheld electronic device 8 and an improved holder 12. The holder 12 cooperates with the handheld electronic device 8, as will be set forth in greater detail below. Examples of handheld electronic devices are disclosed in U.S. Pat. Nos. 6,452,588 and 6,489,950.

The handheld electronic device 8 includes a housing 16, a display 20, a processor 24, a keyboard 28, and a first battery 32. The processor 24 can be any of a wide variety of processors, such as, without limitation, a microprocessor (μP). The processor 24 is operable to receive inputs from the keyboard 28 and to provide processed output to the display 20. The first battery 32 provides power to the processor 24 and the display 20. The handheld electronic device 8 additionally includes a plurality of contacts 36 that are disposed on the housing 16 and are electrically connected with the battery 32.

Figures 4, 5:
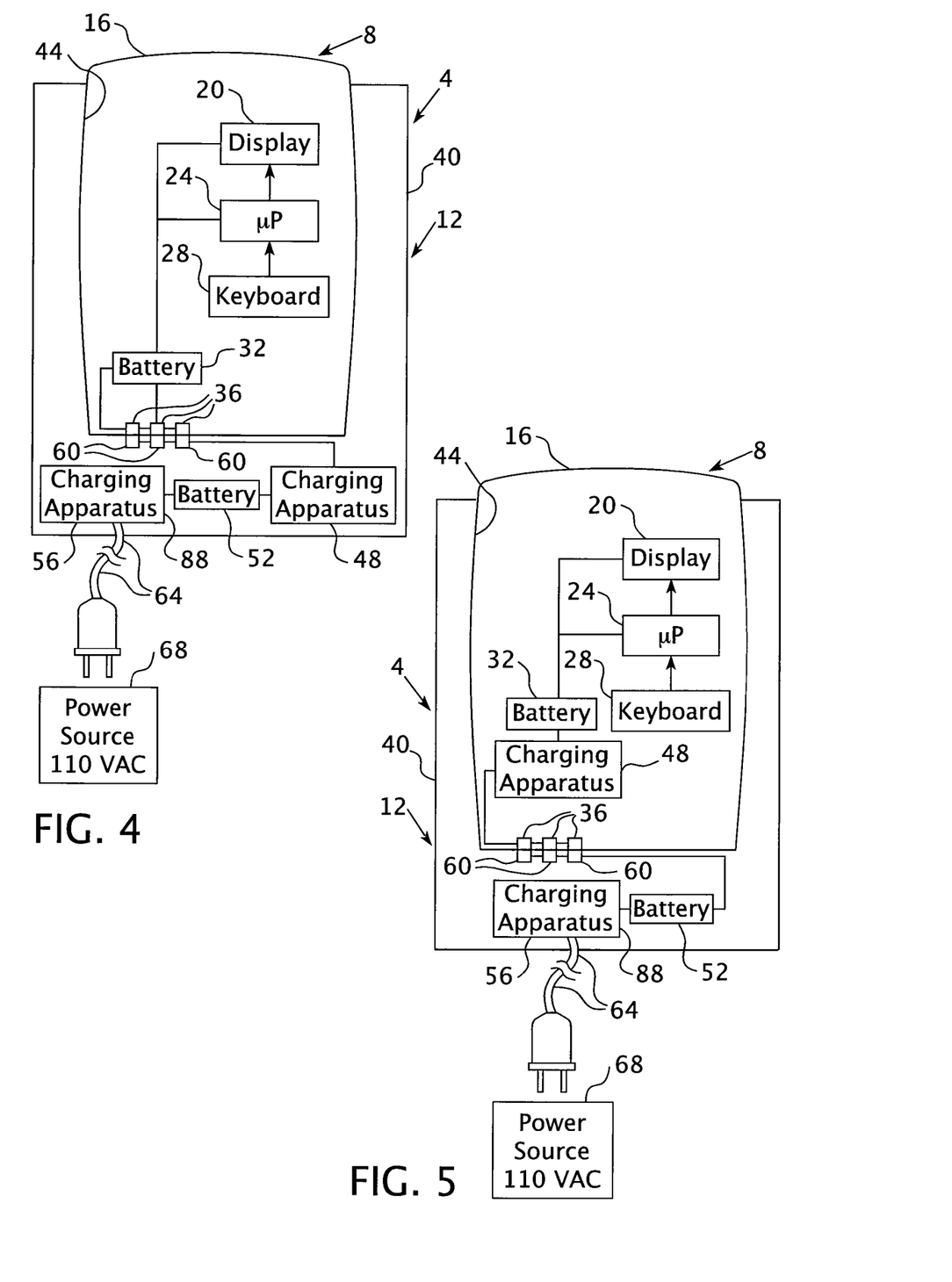
FIG. 4 is a block diagram of the electronic device of FIG. 1.
FIG. 5 is a block diagram of the electronic device in accordance with another embodiment described herein.

The holder or holster 12 includes a housing 40 formed with a cavity 44, a first charging apparatus 48, a second battery 52 and a second charging apparatus 56 (shown in FIG. 4). The first charging apparatus 48 and the second charging apparatus 56 are both electrically connected with the second battery 52. The holder 12 additionally includes a plurality of second contacts 60 (FIG. 4) disposed on the housing 40 within the cavity 44 and, in the embodiment depicted in FIGS. 1 and 2, includes a power cord 64 that is electrically connectable with a suitable external power source 68 (FIG. 4) which, in the present example, is a 110 volt AC power source, though, as will be appreciated in the art, the external power source 68 may also be a USB port. The second contacts 60 are electrically connectable with the first contacts 36 of the handheld electronic device 8. The housing 40 includes an opening 72 formed therein that enables the user to gain access to the keyboard 28 and observe the display 20 when the handheld device 8 is received in a first orientation (FIG. 1) in the housing 40.

The embodiments described herein address the limited battery life of handheld devices by supplementing the charge stored in the handheld battery 32 with charge stored in an additional battery 52 built into the holder or holster 12 through the built in charging contacts 36 of the handheld electronic device 8 and the built in mating charging contacts 60 of the holder 12. The embodiments described herein also do away with the problem of a user charging and carrying two separate batteries by effectively hiding the second battery 52 within an accessory, in this case the holster 12. New flexible battery technologies will allow the secondary battery to be built into plastic holsters or be woven into leather holsters.

Thus the embodiments described herein include a second battery 52 sealed within the holster or holder 12 to provide additional charge to the primary handheld battery 32 through the charge contacts 36 and 60 should the primary battery 32 fall below a preset charge level. Included as part of the device and method described herein is an algorithm which controls the charging and discharging of the secondary battery 52 without the use of charging port 64 on the holster 12. Thus, the object of this embodiment is to have a battery 52 in the holster 12 that will act to supplement the device battery 32, thereby increasing the apparent operating time of the device. Several factors are additionally contemplated to make the added capability of the device described herein more attractive to the user. In the first instance the holster battery 52 should be thin so as not to make the holster 12 bulky. Li-polymer cells satisfy this criterion. They can be made very thin, and yet have a very large area (for increased energy storage capacity), and they are quite flexible. Secondly, the modifications to the device should be minimal. Thirdly, the brunt of the cost of the modification should be borne by the holster side 12 so as not to saddle those users that don't want to bear the cost of this improvement. Fourthly, the holster battery 52 should meet all safety requirements.

In a first preferred embodiment the secondary battery 52 would be a fraction of the size of the primary battery 32, i.e. about 30%. This will, in most instances, permit a user to obtain an additional day or two of use before the handheld electronic device has to be recharged from an external source. It is known that longer battery life improves the user's experience. Unfortunately, improving the technology of the battery or providing a replaceable battery increases the device cost. On the other hand, providing a higher capacity battery would increase the weight and size factors. While optimize software decreases device consumption it is effective up to a certain point.

In a second embodiment the secondary battery 52 in the holster 12 is at least approximately ⅓ larger than the operational battery 32 in the electronic handheld device 8 so that a smaller operational battery 32 with a size and capacity of a about ⅓ of the current battery can be used. The operational battery 32 is installed on the handheld electronic device 8 to maintain it while the user is effectively working. The supplementary or secondary battery 52 is integrated in the holster 12 while the device 8 is in the holster 12 it would consume power from the supplementary battery 52 through power connectors 36 and 60 located in the bottom or back of the handheld electronic device 8. The operational battery 32 would be charged at the same time through these same contacts 36 and 60. For some applications, the average device is in its holster approximately 95% of the time so the capacity of the operational battery that is residing on the device does not need to be as high. On the other hand, the battery residing on the holster can be extended in capacity since its weight would not contribute to the handheld devices weight under this arrangement. If you take the battery out of a handheld electronic device such as the BlackBerry device and hold the device in your hand it feels surprisingly light. The BlackBerry device itself weighs 136 grams. The battery adds an additional 26 grams to the weight. Thus, in this embodiment the weight can be minimized while extending the battery life.

Under either arrangement the user would need to charge only the holster. The battery 32 residing on the handheld electronic device 8 would charge itself from the holsters battery 52. Moreover, the battery 32 on the handheld electronic device 8 does not need to be removable. When the battery 52 on the holster 12 is discharged and the user wants to get her/his device working right away then he/she just takes another holster—a procedure much easier then changing the battery (and the device wont even be restarted). In this way an effective removable battery is achieved in a more cost effective and user friendly way. At the same time the overall battery life of the device can be improved and the weight of the device can be decreased. Whether the larger of the two batteries 32 and 52 is incorporated in the holder 12 or handheld device 8 will depend on the nature of the handheld device and the relative times the device is situated in and out of the holder 12.

Alternatively, in accordance with another embodiment, if the handheld electronic device 8 is separately charged from an external source to substantially its full charge level and the secondary battery 52 on the holster 12 is below a certain level the primary battery 32 on the handheld electronic device 8 may be used to charge the holster battery 52 each time the handheld electronic device 8 is placed within its holster. Preferably, only a preselected amount of charge, for example 100 mAhr (about 10% of the capacity of a typical handheld battery is transferred from the handheld electronic device 8 to the holster battery 52 each time the handheld electronic device 8 is placed within the holster 12, to conserve power in the handheld electronic device 8. The handheld electronic device 8 may be separately charged from an external source, for example, when it is placed in a docking station.

In accordance with this embodiment, the charge algorithm for the electronic device 4 is as follows:

1. If a fully charged handheld device 8 is placed in the holster 12 with a discharged secondary battery 52, the handheld device 8 will allow the holster battery 52 to trickle charge the handheld battery 32 through the charge contacts 36 and 60 down to a preset point of about 3.9V, or 10% of the initial capacity, so that the user does not notice significantly reduced battery life in the primary battery 32. Trickle charging is defined as charging at a small portion of the maximum specified charge rate for a particular battery. Each time a fully charged device is inserted within the holster 12, a preset amount of charge is transferred from the primary battery 32 to the secondary battery under conditions where the secondary battery is to be charged. If the user does not recharge the handheld before the primary battery 32 fully discharges, the holster battery 52 will return the battery charge before the primary battery 32 is fully discharged.
2. Alternatively, the algorithm allows the battery 52 in the holster 12 to be charged when the electronic device 4 is attached to a USB port or 110 volt external source and charge both the primary battery 32 and the secondary battery 52 while the handheld electronic device 8 is in the holster 12. The charge states set forth in the above Paragraph 1 and this Paragraph 2 may be set in a settings menu on the handheld electronic device 8.
3. After several full charge insertions of the handheld electronic device 8 into the holder 12, without drain of the primary battery 32 below a set level, which is preferably, substantially equal to the full charge level of the primary battery, the secondary battery 52 will contain a full charge and will no longer take charge from a fully charged primary battery 32.
4. During travel, or when the user is away from a charge source for an extended period, and the handheld battery reaches a preset highly discharged level, such as one bar on the screen, the handheld electronic device 8 can request charge from the secondary battery 52 to partially recharge the battery 32 on the handheld electronic device 8. In this event, with a reasonable efficiency of transfer of energy, the user may gain upwards of one or two days of use.

Figure 6:
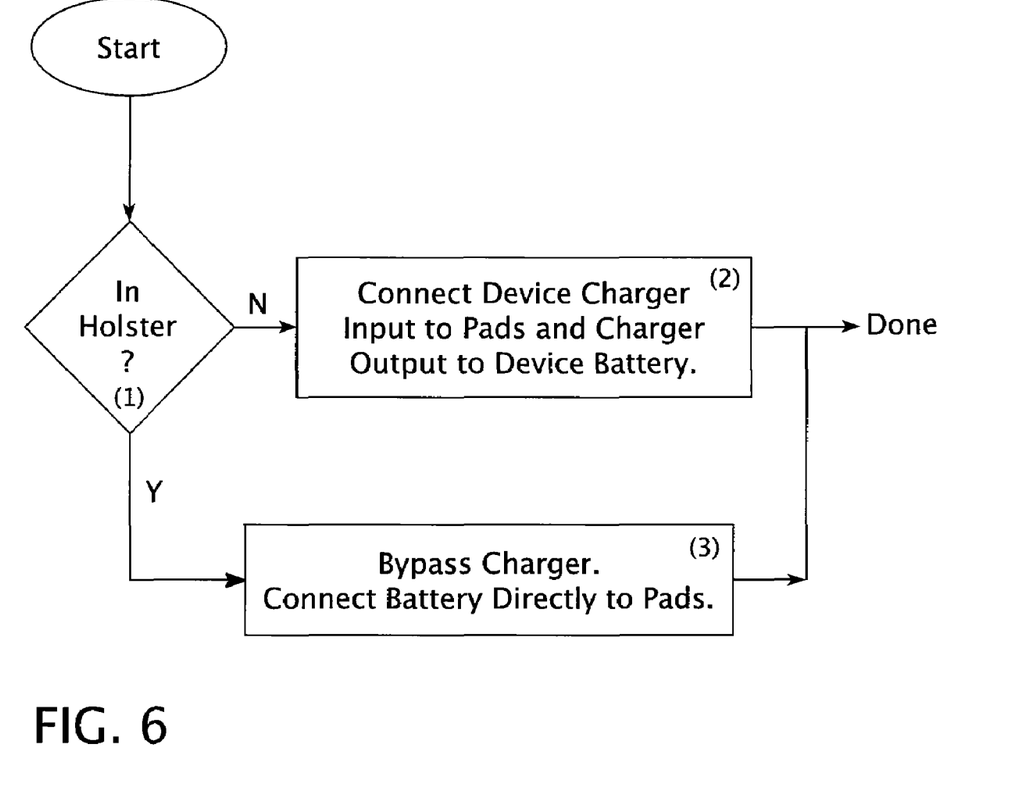
FIG. 6 is a logic flow chart of the operation of the handheld electronic device described herein.
Figure 7:
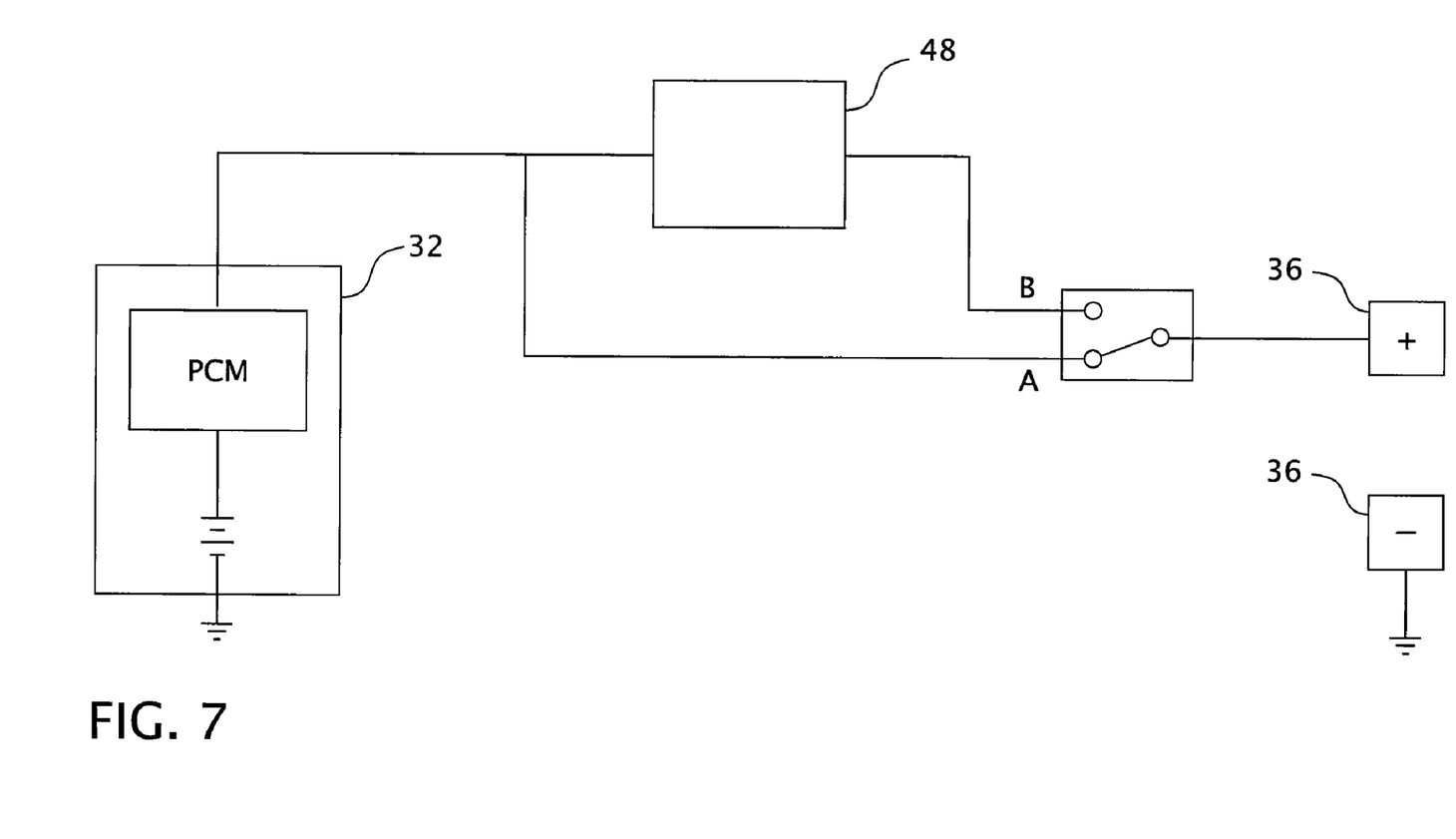
FIG. 7 is a block circuit diagram of the charging circuit of the handheld electronic device described herein.

FIGS. 6 and 7 respectively show the logic and circuitry modifications that are applied to the handheld electronic device 8 to implement this embodiment. From FIG. 6 it can be appreciated that the device detects whether it is holstered or not. This is readily done with handheld electronic devices 8 such as a BlackBerry by the use of a magnetic reed switch inside the device that detects a magnetic field generated by a small permanent magnet inside the holster. When the handheld electronic device 8 is in the holster 12, the battery terminals 36 are made directly accessible to the electronic device "charging" pads 60. Otherwise the device charging pads act just as they would normally and that is to be normal charging pads, such as for cradle charging. The logic for this operation is illustrated in FIG. 6 and a block diagram of the battery charging circuit for the handheld electronic device 8 is shown in FIG. 7. When the reed switch is high, that is in position A, the charging pads 36 are connected directly to the battery 32 through a protection circuit module 76 which is an integral part of the battery pack 32. The protection circuit module 76 protects the battery on the handheld device 8 from overcharging. When the reed switch 72 is low, that is position B the handheld electronic device 8 battery charger 48 is interposed between the charging pads 36 and the battery pack 32. Thus, very little modification and expense has to be added to the handheld electronic device 8 to implement this embodiment.

Figure 8:
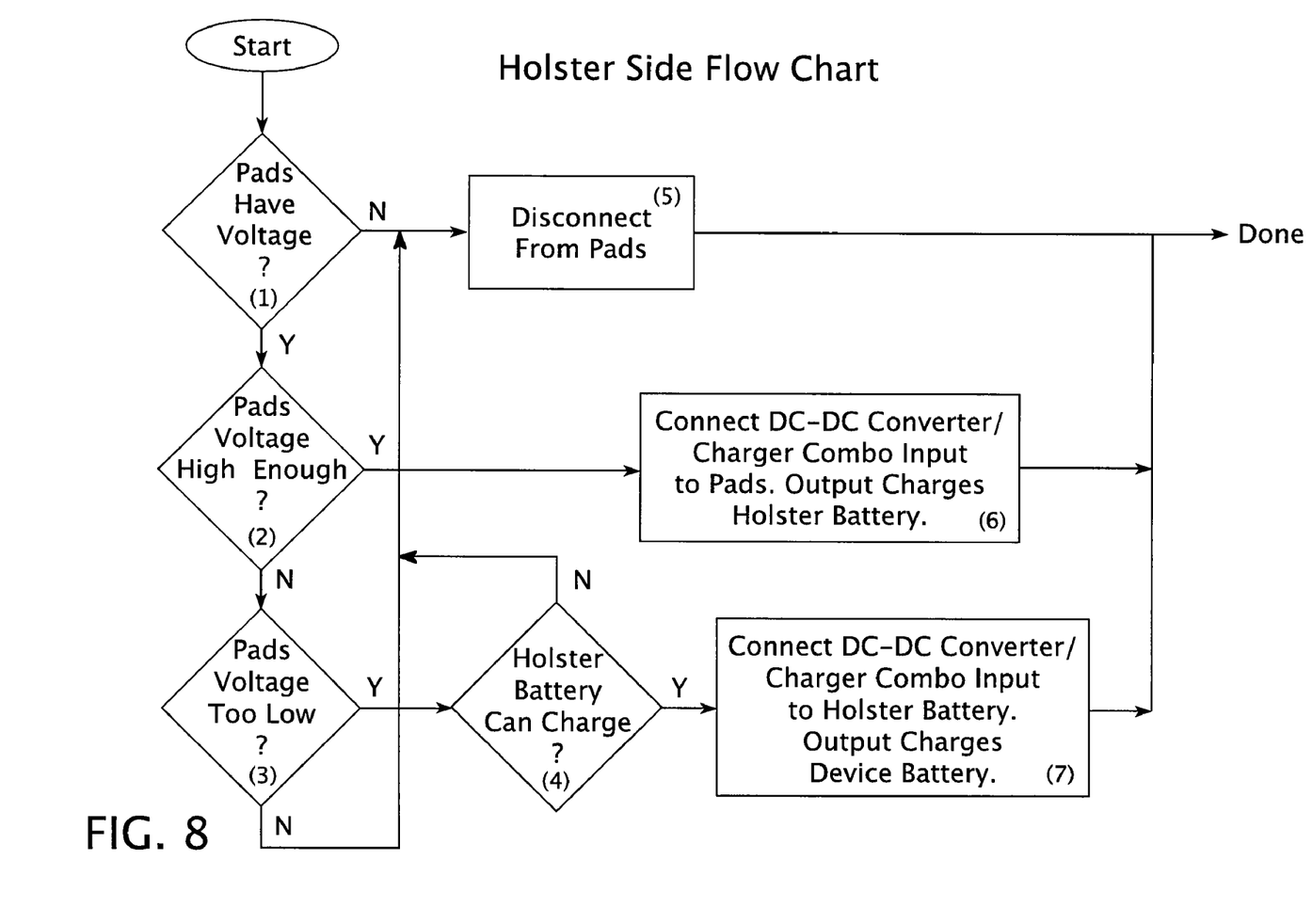
FIG. 8 is a logic flow chart of the circuitry of the holder of the device described herein.
Figure 9:
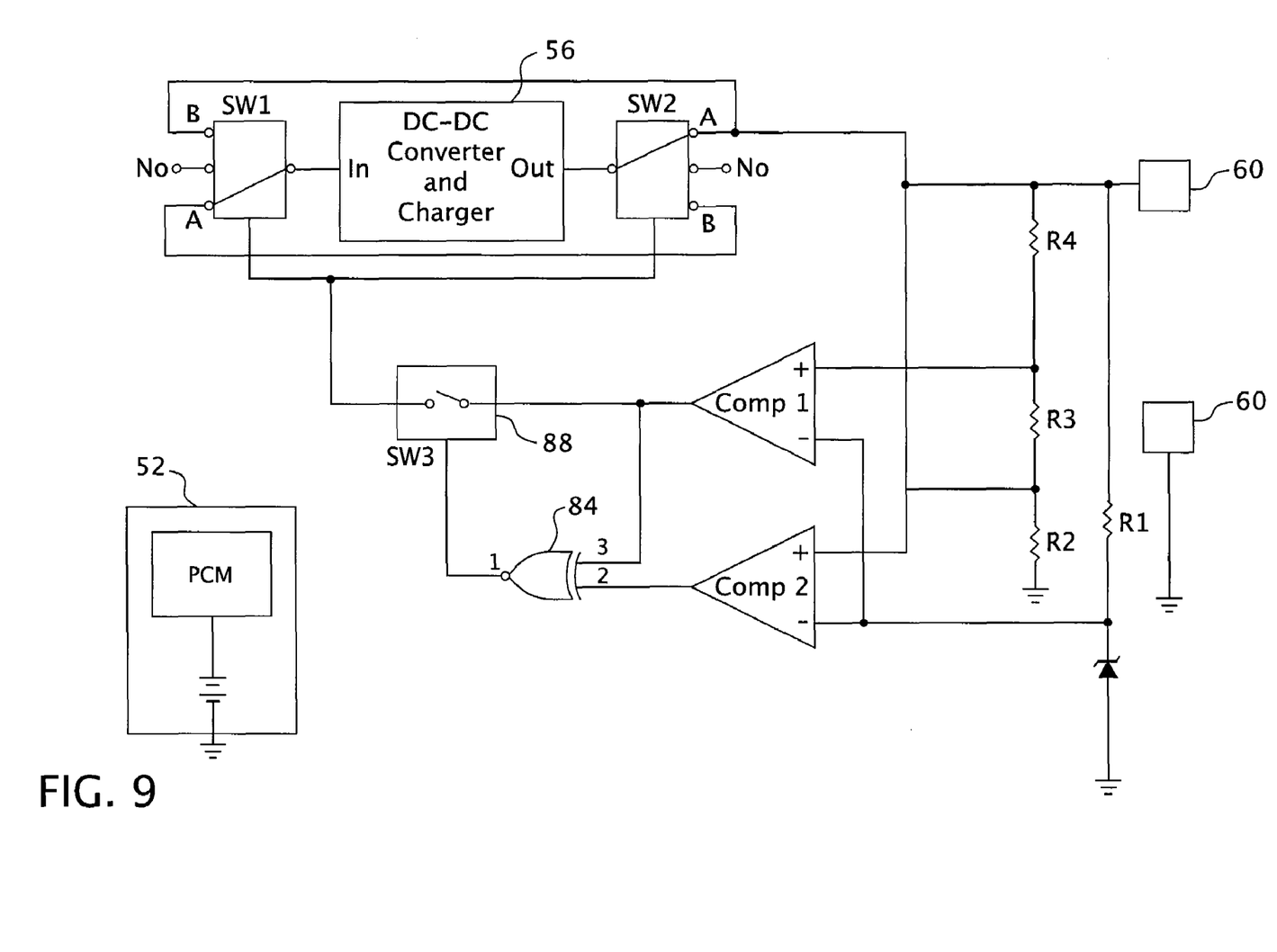
FIG. 9 is a block circuit diagram of the holder charging circuit of the device described herein.

Most of the modification is made to the holster or holder 12 as illustrated in the logic flowchart shown in FIG. 8 and the circuit block diagram illustrated in FIG. 9. Referring to FIG. 8 it can be appreciated that when the handheld electronic device 8 is in the holster 12 the pads 60 will be connected to the battery 32 on the handheld electronic device 8 and will thus have a voltage on them. Normal Li-Ion batteries have voltages of about 4.2 V when fully charged. These batteries plateau at around 3.7 V-3.8 V during most of their discharge, and quickly drop during the final stages of discharge. In fact, at about 3.3 V, the cells of the battery contain less than 10% energy left in them. All of these values are room temperature values and these room temperature values will be used in this embodiment. Various other schemes can also be used to determine the state of charge of the lithium Li-Ion battery, for example Coulomb Counting could be employed, in which the amount of charge required to fill a completely discharged battery is recorded and the State of Charge, or SoC, is determined by counting the amount of charge dispensed. As can be seen from FIG. 8 the algorithm for holster operation is as follows:

1. The circuit in the holder 12 determines if the handheld electronic device battery 32 can provide some charge to charge up the holster battery 52. This is primarily done by measuring the voltage of the handheld electronic device battery 32. If it is high enough (that is around 3.8 V+, meaning that the device battery is itself fully charged), then this condition is TRUE. In this case an internal (to the holster 12) DC-DC converter/charger is used to leak off some charge to charge up the holster battery Up to 10% of the device battery's charge is a reasonable amount to be leaked off for this purpose. The DC-DC converter is needed because most chargers need a somewhat higher voltage at their inputs than what they will provide at their outputs. So, to fully charge up a Li-Ion or Lithium polymer battery to 4.2 V, typical chargers need at least 5.0 V. Since the power source itself is a Li-Ion battery, there is a need for a DC-DC conversion to boost up the charger input.
2. If the handheld device battery 32 is in between fully charged and near empty (between approximately 3.8 V to 3.4 V) then the handheld electronic device 8 can neither provide charge to the holster, nor does it need a boost from the holster and the pads 60 are disconnected from the battery 32. In this case the battery may have reached this stage from the stage described in Paragraph 1 above, or it may already be in this state at the moment when it was holstered. In the first case, this stage provides a mechanism to stop charging in accordance with Paragraph 1 immediately above without having the holster 12 immediately switch back and forth between that set forth in Paragraph 1 above and that provided in Paragraph 3 immediately below.
3. If the handheld electronic device battery 32 is very low, then the holster battery 52 will give back some of its charge. The holster battery 52 itself should not give back so much of its charge that it drains itself beyond its limits. This is accomplished through the protection circuit module (PCM) which prevents the holster battery 52 from over discharging and short circuits, etc. If the holster battery has enough charge, then the direction of the DC-DC converter/charger is changed, and the holster battery 52 charges the device battery 32, until the latter reaches the threshold set forth in Paragraph 2 immediately above. In this case the charging will stop.

The circuit diagram in FIG. 9 implements the flow diagram illustrated in FIG. 8. Switch SW1 and SW2 perform the DC-DC converter/charger input/output reversing functions and are respectively connected to the input and the output of DC-DC converter/charger 78. Comparators COMP1 and COMP2 detect the state of the handheld electronic device battery 32. When the voltage is above the lower threshold level as inputed from the voltage divider circuit R2, R3 and R4, COMP2 outputs high. When the voltage is above the upper threshold, that is in this example 3.8 V, COMP1 turns high. In between, COMP1 will be low and COMP2 will be high. There cannot be a case where COMP1 is high and COMP2 is low. Accordingly, when the battery is near full COMP1 will be high and COMP2 will be high enabling gate 84 to provide a high input to the SW3 switch input 88. The high input closes the SW3 switch and delivers a high output to the control input terminal of SW1 and SW2 which moves both switches to connect terminal A so that the handheld electronic device 8 charges the holster battery 52. When the handheld electronic device battery 32 is in its mid range, identified in Paragraph 2 immediately above, the output of COMP1 will be low and the output of COMP2 will be high providing a low output from the gate 84 to the control input terminal 88 of switch SW3. The low input opens the switch and opens circuits both SW1 and SW2 to the NO position and no charge sharing occurs. When the handheld electronic device battery 32 is near empty the output of COMP1 and COMP2 will be low causing the control input to SW3 from the gate 84 to be high. This high input delivers a low input to the control terminals of switches SW1 and SW2 which connects the switches SW1 and SW2 to terminal B so that the holster battery 52 charges the handheld electronic device battery 32. The switching logic is summarized in the following Table 1.

TABLE 1

| State | Comp1 | Comp2 | SW3 | SW3 | Action |
|---|---|---|---|---|---|
| Near Full | High | High | High | High | Device charges holster |
| Mid | Low | High | X | Low | No charge sharing |
| Near Empty | Low | Low | Low | High | Holster charges device |

The X in the Table means that no output is provided since the switch SW3 under those circumstances is open circuited. Accordingly, the apparatus of this embodiment allows a holster to effectively "steal" small of amounts of charged over time from a fully charged handheld electronic device, and hold it in reserve until required by a user, at the very low end of the primary battery charge cycle, for an additional day or two of use. The device described herein also can reduce the weight of the handheld electronic device without compromising the battery capacity.

While specific embodiments have been described in detail it will be appreciated by those skilled in the art that various modifications and alternatives to those details could be developed in light of the overall teachings of the disclosure. Accordingly, the particular embodiments disclosed are meant to be illustrative only and not limiting as to the scope of the device and method described herein, which is to be given the full breath of the appended claims and any or all equivalence thereof.

What is claimed is:

1. An electronic device comprising:
   a handheld electronic device having a first battery;
   a holder having a second battery;
   said handheld electronic device and said holder being electrically connectable together; and
   a charging apparatus disposed on at least one of said handheld electronic device and said holder, said charging apparatus being adapted to charge said first battery from said second battery and said second battery from said first battery under programmed conditions wherein the first battery only charges the second battery when the second battery is not fully charged and the first battery is substantially fully charged and when charging the second battery the first battery only delivers a preselected amount of current each time the handheld electronic device is electrically connected to the second battery.

2. The electronic device of claim 1 wherein the first battery is substantially larger than the second battery.

3. The electronic device of claim 2 wherein the second battery is approximately 30% of the size of the first battery.

4. The electronic device of claim 1 wherein the first battery draws charge from the second battery when the second battery has a charge level above a first pre-selected charge level and the first battery has a charge level below a second pre-selected charge level and the first battery is electrically connected to the second battery.

5. The electronic device of claim 1 wherein the second battery draws a trickle charge of approximately 100 mAhr or less.

6. The electronic device of claim 1 wherein the pre-selected amount of current is determined by the charge level of the first battery.

7. The electronic device of claim 1 including a charging circuit on at least one of said handheld electronic device and said holder connectable to an outside charging source for charging one or both of the first battery and the second battery.

8. The electronic device of claim 7 wherein the outside charging source is a USB port.

9. The electronic device of claim 1 wherein the charging apparatus does not draw current from the first battery to charge the second battery when the second battery is substantially fully charged.

10. The electronic device of claim 1 wherein when the handheld electronic device is in the holder and connected to the second battery it is programmed to consume power from the second battery rather than the first battery.

11. The electronic device of claim 1 wherein the first battery is substantially smaller than the second battery.

12. A method of extending the charge of a first battery on a handheld electronic device that is stored at times in a holder having a second battery which is electrically coupled to the first battery when the handheld electronic device is so stored, said method comprising:
   inserting the handheld electronic device into the holder;
   electrically connecting the first battery to the second battery;
   determining whether the charge level of the first battery is at or above a first pre-selected level;
   determining that the second battery is not fully charged;
   drawing a pre-selected amount of current from the first battery to charge the second battery;
   determining that the charge level of the first battery is at or below a second pre-selected level and determining the charge level of the second battery is above a third pre-selected level; and
   drawing current from the second battery to charge the first battery.

* * * * *